United States Patent
Thompson

(10) Patent No.: US 10,432,483 B1
(45) Date of Patent: Oct. 1, 2019

(54) GENERAL-PURPOSE METRICS PUBLISHING WITH VARIABLE RESOLUTION

(71) Applicant: Amazon Technologies, Inc., Seattle, WA (US)

(72) Inventor: James Michael Thompson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 15/276,571

(22) Filed: Sep. 26, 2016

(51) Int. Cl.
*H04L 12/26* (2006.01)
*H04L 29/08* (2006.01)

(52) U.S. Cl.
CPC ............ *H04L 43/045* (2013.01); *H04L 67/10* (2013.01)

(58) Field of Classification Search
CPC .................................................... H04L 43/045
USPC ......................................................... 709/224
See application file for complete search history.

(56) References Cited

U.S. PATENT DOCUMENTS

| | | | | |
|---|---|---|---|---|
| 6,789,046 | B1* | 9/2004 | Murstein | G06F 11/3476 702/182 |
| 7,627,671 | B1* | 12/2009 | Palma | G06F 11/3616 709/223 |
| 7,664,847 | B2* | 2/2010 | Colrain | G06F 9/5027 709/223 |
| 8,744,890 | B1* | 6/2014 | Bernier | G06Q 10/0631 705/7.11 |
| 9,081,834 | B2* | 7/2015 | Bhave | G06F 17/30283 |
| 9,274,849 | B1* | 3/2016 | Estes | G06F 9/5072 |
| 9,356,883 | B1* | 5/2016 | Borthakur | H04L 41/5025 |
| 9,391,866 | B1* | 7/2016 | Martin | H04L 41/0681 |
| 9,691,046 | B1* | 6/2017 | Adler | G06Q 10/0635 |
| 2003/0093250 | A1* | 5/2003 | Goebel | G06F 17/10 703/2 |
| 2007/0226697 | A1* | 9/2007 | Barsness | G06F 11/3612 717/127 |
| 2007/0294399 | A1* | 12/2007 | Grossner | H04L 41/22 709/224 |
| 2009/0030771 | A1* | 1/2009 | Eder | G06Q 10/10 705/35 |

(Continued)

OTHER PUBLICATIONS

Askarov et al., "Predictive Black-Box Mitigation of Timing Channels", 2010 (Year: 2010).*

(Continued)

*Primary Examiner* — Ondrej C Vostal
(74) *Attorney, Agent, or Firm* — Patterson + Sheridan, LLP

(57) ABSTRACT

Embodiments presented herein describe an I/O client that switches between generating high-resolution and low-resolution performance data in response to a defined event indicating there is a performance issue with a storage volume. In one embodiment, the I/O client uses one or more event rules that define a condition or threshold for determining whether to generate high-resolution or low-resolution performance data. In one embodiment, the I/O client transmits the performance data to a central monitoring system which can generate a chart plotting the performance data overtime. Because the I/O client may generate the high resolution performance data only when an event rule indicates there is a performance issue, the amount of performance data transmitted to the central monitoring system can be reduced.

19 Claims, 6 Drawing Sheets

(56) References Cited

U.S. PATENT DOCUMENTS

| | | | | |
|---|---|---|---|---|
| 2012/0278292 A1* | 11/2012 | Zahavi | ............... | G06F 11/3476 707/694 |
| 2012/0304171 A1* | 11/2012 | Joshi | .................. | G06F 9/45558 718/1 |
| 2013/0091266 A1* | 4/2013 | Bhave | ............... | G06F 11/3476 709/224 |
| 2014/0136294 A1* | 5/2014 | Martinovic | ...... | G06Q 10/06375 705/7.37 |
| 2014/0229638 A1* | 8/2014 | Zhou | ...................... | G06F 3/061 710/38 |
| 2014/0304176 A1* | 10/2014 | Radding | ............. | G06Q 50/184 705/310 |
| 2014/0359376 A1* | 12/2014 | Fahimi | ............... | G06F 11/0751 714/48 |
| 2015/0088783 A1* | 3/2015 | Mun | ...................... | G06Q 10/04 705/36 R |
| 2015/0178633 A1* | 6/2015 | ElBsat | .................... | G06F 17/16 706/14 |
| 2015/0236934 A1* | 8/2015 | Huang | ................ | G06F 16/2365 709/224 |
| 2015/0254000 A1* | 9/2015 | Sivathanu | ........... | G06F 12/0868 711/103 |
| 2016/0080485 A1* | 3/2016 | Hamedi | .................. | H04L 67/02 709/204 |
| 2016/0173321 A1* | 6/2016 | Gukal | .................. | H04L 41/064 709/224 |
| 2016/0350173 A1* | 12/2016 | Ahad | .................. | G06F 11/3495 |
| 2017/0060653 A1* | 3/2017 | Nandakumar | ........ | G06F 11/079 |
| 2017/0063710 A1* | 3/2017 | Smith | .................. | H04L 67/306 |
| 2017/0123883 A1* | 5/2017 | Hall | ...................... | G06F 11/008 |
| 2017/0213028 A1* | 7/2017 | Chen | .................... | G06F 9/45558 |
| 2017/0357968 A1* | 12/2017 | Hey | ...................... | G06Q 20/20 |
| 2018/0012252 A1* | 1/2018 | Balasubramanian | ... | G06F 9/542 |

OTHER PUBLICATIONS

Kim, "Internet-centric solution is more than moving online", Lexology, 2015 (Year: 2015).*

Microsoft Computer Dictionary, "real-time", p. 441, 2002 (Year: 2002).*

Microsoft Computer Dictionary, "bandwidth", p. 50, "throughput", p. 519, 2002 (Year: 2002).*

Mooney, "Monte Carlo Simulation", pp. 1-4, 1997 (Year: 1997).*

* cited by examiner

GENERAL-PURPOSE METRICS PUBLISHING WITH VARIABLE RESOLUTION

BACKGROUND

Input/output (I/O) latency is an important metric for tracking the status and performance of two computing systems coupled via a network. Typically, the computing systems (e.g., a server, mobile device, laptop, desktop computer, storage volume, router, switch, etc.) record performance metrics that can be used to measure system performance e.g., if one of the entities is overworked or is assigned insufficient bandwidth. System administrators often rely on such metrics to diagnose performance issue and identify solutions to issues. As such, providing the system administrator with accurate and detailed performance metrics helps the administrator to make an appropriate decision for addressing a performance issues.

BRIEF DESCRIPTION OF THE DRAWINGS

Various embodiments in accordance with the present disclosure will be described with reference to the drawings, where like designations denote like elements.

DETAILED DESCRIPTION

Embodiments presented herein describe generating performance data regarding a computing system or device (e.g., a server, mobile device, laptop, desktop computer, storage volume, router, switch, virtual machine, etc.) For example, one embodiment includes an I/O client that switches between generating high-resolution and low-resolution performance data in response to events indicating a performance issue with a storage volume. The I/O client may be an intermediary between a storage volume and a computing system which enables the computing system to read data from, and store data in, the storage volume. In one embodiment, the I/O client uses a flexible collection of event rules that define a condition or threshold for determining whether to generate high-resolution or low-resolution performance data. For example, an event rule may specify that if the latency of an I/O request increases above 100 milliseconds (ms), the I/O client should generate performance data at a high-resolution rate—e.g., the I/O client determines the average latency of all the I/O requests completed in a second. Otherwise, the I/O client generates performance data at a low-resolution rate—e.g., the average latency of all the I/O requests completed in a minute. In one embodiment, the I/O client transmits the performance data to a central monitoring system which can generate a chart plotting the performance data overtime. Generating the high resolution performance data only when an event rule indicates a potential performance issue reduces the amount of performance data transmitted to the central monitoring system. When an event rule is triggered, the I/O client transmits high resolution performance data to the central monitoring system which can be reviewed by a system administrator to diagnosis any performance issues and identify an appropriate remedy.

In one embodiment, the I/O client serves as an intermediary between a virtual machine and a mounted storage volume. The virtual machine and the mounted storage volume may be hosted on separate computing systems connected to a network. To perform a read or write to the storage volume, the virtual machine transmits an I/O request to the I/O client which either requests corresponding read data from the storage volume or transmits write data to the storage volume. Further, the I/O client can measure performance metrics derived from performing the I/O requests such as overall latency, data throughput (e.g., Mb/s), or transaction rate (i.e., the number of I/O requests completed in a given period of time). The I/O client may compare one or more of these performance metrics to conditions or thresholds in an event rule to determine when to transition between generating high resolution or low resolution performance data. The I/O client transmits the performance data to the central monitoring system.

Figure 1:
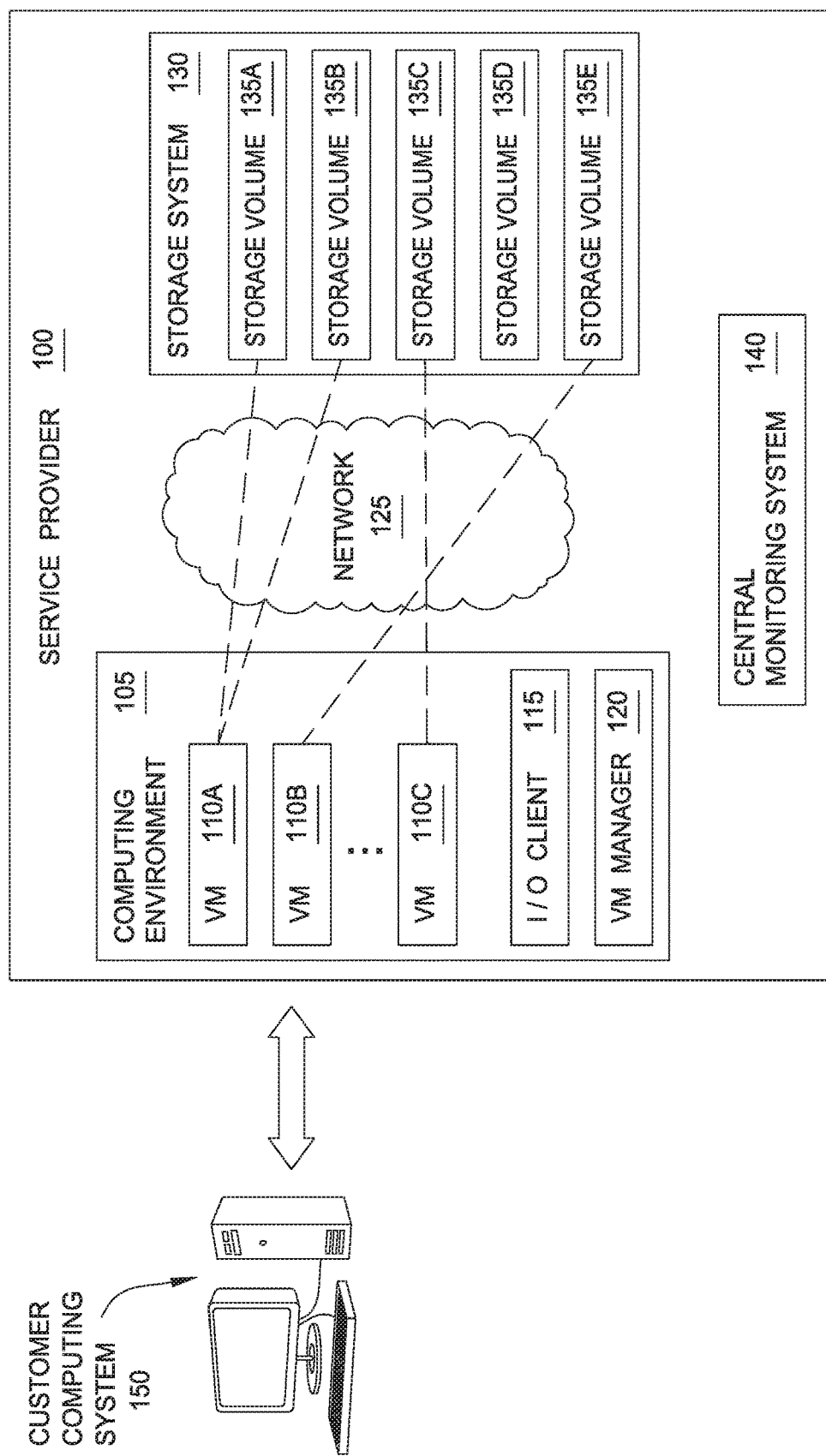
FIG. 1 illustrates virtual machines mounted to one or more storage volumes, according to various embodiments.

FIG. 1 illustrates virtual machines (VM) 110 with one or more mounted storage volumes 135, according to various embodiments. As shown, the VMs 110 and storage volumes 135 are contained within a service provider 100 (e.g., an infrastructure for a cloud environment). The service provider 100 includes computing environment 105 which hosts the VMs 110 and a storage system 130 which contains the storage volumes 135. Although not shown, the computing environment 105 includes a collection of physical computing systems, storage systems, and other hardware and software used to host virtual machine instances (e.g., VMs 110), applications, and data for users. In various embodiments, the computing environment 105 may be a physical data center, a cluster of computing systems, a geographic region (e.g., the Southwest region of the United Stated), or an availability zone (i.e., a group of redundant, computing resources that offer failover capability in the event of power failures or service interruptions occurring in other computing environments). Cloud computing regions generally correspond to a region defined by a service provider in offering cloud based services to clients (e.g., the access to the computing environment 105 and storage system 130). Users may develop and submit applications for execution on the computing environment 105 in the regions. While cloud computing regions may be drawn along arbitrary boundaries, cloud computing regions often correspond to geographic, national, or fault tolerance boundaries, where computing resources in one region are deployed and managed in a manner that is generally isolated from other regions. For example, cloud computing environment 105 and storage system 130 may each correspond to a data center (or data centers) located in a particular geographic area. Data centers in different regions may help provide fault-tolerant services, e.g., should a data center in one region become inaccessible, other data centers in that region (or other regions) may continue to operate with little or no interruption to the services hosted in such regions. Further, the provider may enable multiple physical or logical zones within a given cloud computing region. For example, a single data center used to provide a cloud computing region may offer multiple, fault tolerant availability zones, where a service disruption in one availability zone does not impact other availability zones within the same cloud computing region (or other regions) and the availability zones within a region may provide inexpensive, low-latency network connectivity to other availability zones within the same region.

In addition to the VMs 110, the computing environment 105 includes an I/O client 115 and VM manager 120. The I/O client 115 serves as an intermediary between the VMs 110 and the storage volumes 135. In FIG. 1, the dotted lines illustrate which of the storage volumes 135 are mounted to which of the VMs 110. For example, storage volumes 135A and 135B are mounted to VM 110A while storage volume 135E is mounted to VM 110B. To read and write to the storage volumes 135, the VMs 110 transmit read and write requests (referred to generally as I/O requests) to the I/O client 115 which uses a network 125 to execute these requests. That is, the storage volumes 135 may be remotely located from the VMs 110 (e.g., on separate computing devices) which are communicatively coupled via the network 125. Although only one I/O client 115 is shown, in one embodiment, each VM 110 is assigned an individual I/O client. As described in more detail below, the I/O client 115 measures one or more performance metrics derived from completing the I/O requests. Using these performance metrics, the I/O client 115 determines whether to generate high resolution performance data or low resolution performance data corresponding to the storage volume (or volumes) 135 mounted to each VM 110. The I/O client 115 transmits the performance data (also referred to as storage volume status data) to a central monitoring system 140.

In one embodiment, the I/O client 115 may be hosted on the same computing system that hosts the VMs 110. However, the I/O client 115 could also be external to the VM 110. For example, the I/O client 115 may be part of the hypervisor that manages the VM 110. When a storage volume 135 is attached or mounted to a VM 110, the host computing system for the VM 110 configures the I/O client 115 to access the mounted storage volume 135 so that the I/O client can perform the I/O requests. In one embodiment, the host computing system performs an authorization check to ensure the I/O client 115 has the proper permissions to access the storage volume 135.

The VM manager 120 manages the VMs 110. In one embodiment, the VM manager 120 boots or spins up the VMs 110 in response to a request from a customer computing system 150. The VM manager 120 also manages the underlying hardware resources hosting the VMs 110 and can allocate memory, processors, and specialized hardware for use by the VMs 110. Additionally, when booting the VMs 110, the VM manager 120 selects the operating system as well as the applications executed by the operation system. For example, the VM manager 120 may configure a VM 110 to perform a particular task for the customer such as executing a web server, hosting a database, performing simulations, streaming media content, and the like. The number of VMs 110 requested by the customer computing system 150 may vary in which case the VM manager 120 may add or remove (i.e., spin down) a VM 110. In this manner, the number of VMs 110 can vary according to the needs of the customer.

The storage system 130 provides mass storage for applications and data corresponding to the VMs 110. That is, a VM 110 may mount one of the storage volumes 135, but storage volumes 135 persist independently from the life of that VM 110. Each storage volume 135 may include one or more storage devices such as a hard disk drive or solid-state drive. In one embodiment, the data throughput, I/O latency, and data transaction rate for a storage volume 135 varies depending on its underlying storage devices. For example, a storage volume 135 that includes a solid-state drive may have lower latency than a storage volume 135 with a hard disk drive. However, the cost of a storage volume 135 that includes a solid-state drive may be more than a similarly sized storage volume 135 that includes a hard disk drive.

As mentioned above, the central monitoring system 140 receives performance data from the I/O client 115 regarding the storage volumes 135. The performance data may indicate an I/O latency of the storage volume (i.e., the time required for a particular I/O request or the average time for a plurality of I/O requests to complete), a data throughput rate (e.g., the number of megabytes per second read from or written to the storage volume), or a transaction rate (e.g., the total number of I/O requests completed for a fixed time period). The central monitoring system 140 can provide this performance data to a system administrator or to the customer in order to identify potential performance issues. In one embodiment, the central monitoring system 140 generates a chart which includes the performance data in a graphical format. Moreover, a time axis on the chart may vary depending on whether the I/O client 115 transmitted high resolution performance data to the central monitoring system 140 (e.g., the data throughput for each second) or low resolution performance data (e.g., the data throughput for each minute). The high resolution performance data provides a more granular view of the collected performance data, which, in some cases, may assist to identify a performance problem when a performance metric changes—e.g., the I/O latency increases, or the transaction rate or data throughput rate decrease. Advantageously, during normal operation (i.e., when performance metrics are within predefined limits), the I/O client 115 transmits low resolution performance data to the central monitoring system 140, reducing the bandwidth between the I/O client 115 and the central monitoring system 140 and the computing resources that execute the central monitoring system 140.

Figure 2:
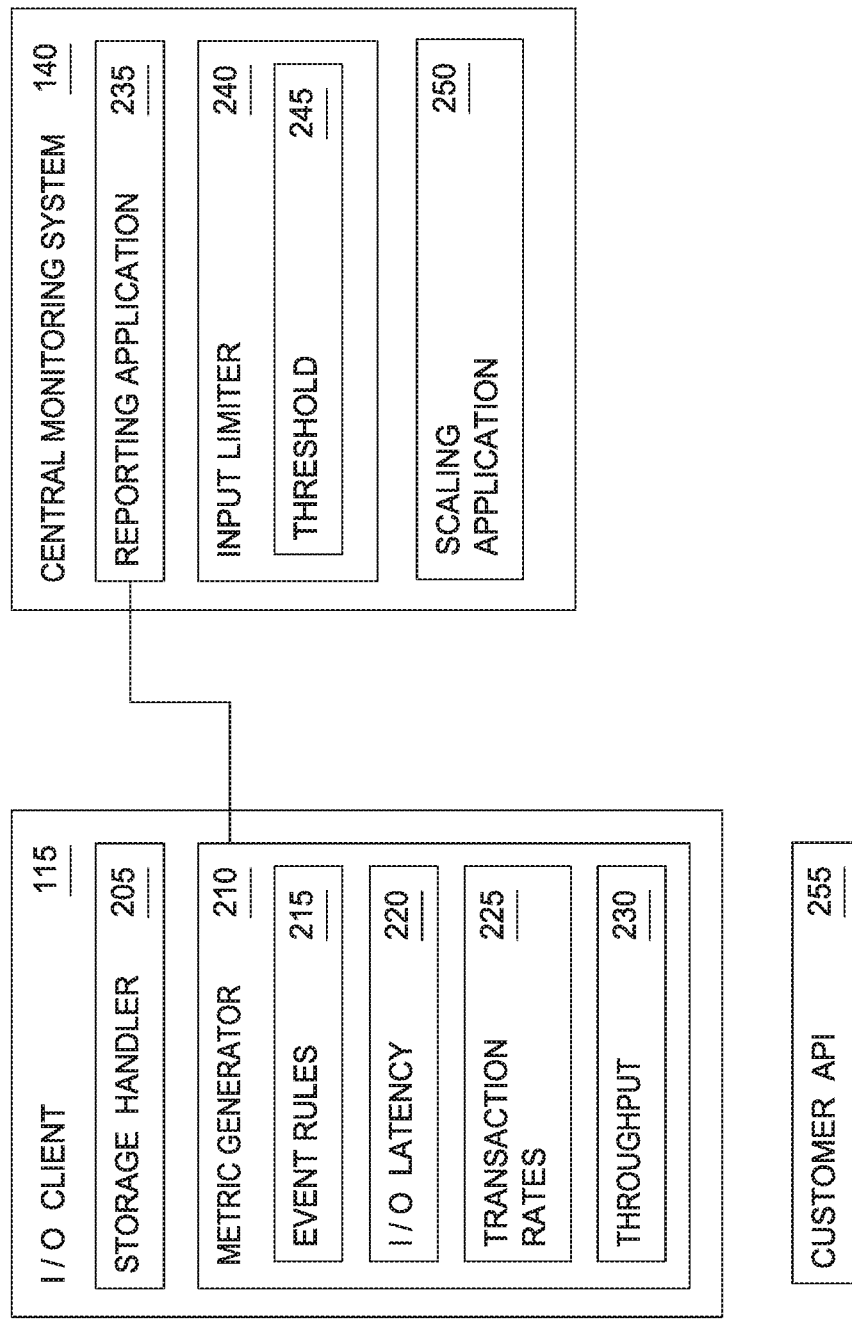
FIG. 2 is a block diagram of an I/O client that provides performance data to a central monitoring system, according to various embodiments.

FIG. 2 is a block diagram of an I/O client 115 that provides performance data to the central monitoring system 140, according to various embodiments. As shown, FIG. 2 illustrates a system 200 that includes the I/O client 115, the central monitoring system 140, and a customer application programming interface (API) 255. The I/O client 115 includes a storage handler 205 and a metric generator 210. The storage handler 205 receives I/O requests from VMs (which may be forwarded to the I/O client 115 from the hypervisor) to perform on a mounted storage volume. If the I/O request is a read operation, the storage handler 205 transmits a pointer or address that identifies the requested data to the mounted storage volume which in turn provides the requested data. If the I/O request is a write operation, the storage handler 205 forwards write data received from the VM to the storage volume which then may transmit a confirmation to the storage handler 205 when the data is successfully written into the storage volume.

The metric generator 210 measures performance metrics derived in response to the storage handler 205 performing the I/O requests. Further, the metric generator 210 determines when to generate low resolution or high resolution performance data which is then transmitted to the central monitoring system 140. To do these tasks, the metric generator 210 stores event rules 215, I/O latency 220, transaction rates 225, and data throughput 230 corresponding to a mounted storage volume. The event rules 215 define conditions or thresholds corresponding to a performance metric that indicate when the mounted storage volume may be experiencing a performance issue. For example, the metric generator 210 may continuously, or at intervals, measure a performance metric such as the I/O latency 220, the transaction rate 225, or data throughput 230 of the mounted storage volume and compare the performance metric to a condition or threshold in the event rule 215. If the performance metric satisfies the condition or threshold (e.g., the I/O latency 220 exceeds 100 ms) the metric generator 210 switches from generating low resolution performance data to generating high resolution performance data. This process is described in more detail below. Although in this example the metric generator 210 measures the performance metric, in other embodiments, the performance metrics may be measured by the hypervisor or a storage volume controller which forwards the metrics to the I/O client 115.

The performance data may include the same data as the performance metric. For example, the metric generator 210 may monitor the I/O latency 220 of the storage volume to determine when the switch from generating low resolution I/O latency performance data (e.g., the average latency of the I/O requests performed every minute) to generating high resolution I/O latency performance data (e.g., the average latency of the I/O requests performed every minute). In this example, the performance metric and the performance data correspond to the same type of data—i.e., the I/O latency 220 of the storage volume. Conversely, the performance data may include a different type of data than the performance metric. For example, the metric generator 210 may monitor the transaction rate 225 of the storage volume to determine when to switch between generating low resolution data throughput performance data (e.g., the data throughput of the storage volume over the last second) to generating high resolution data throughput performance data (e.g., the data throughput of the storage volume over the last tenth of a second). In this example, the performance metric is the transaction rate 225 while the performance data reported to the central monitoring system 140 is the data throughput 230 of the storage volume.

In one embodiment, the metric generator 210 may monitor a combination of performance metrics to determine when to generate high resolution performance data. For example, an event rule 215 could specify to generate high resolution performance data if the I/O latency 220 is above 100 ms and the data throughput 230 is less than 500 Mb/s. Similarly, the performance data reported to central monitoring system 140 may include a combination of the I/O latency 220, transaction rate 225, and the data throughput 230.

The customer API 255 permits a customer (e.g., a party who controls a VM), to define an event rule 215. In one embodiment, the customer API 255 may include a web portal that permits the customer to specify under what conditions the customer wants the metric generator 210 to report out high resolution performance data regarding the mounted storage volumes. For example, the API 255 may include a sliding scale or data field that allows the customer to specify an I/O latency value, transaction rate value, or data throughput value. When the performance metric exceeds or falls below the value or values, the metric generator 210 generates high resolution performance data. In another example, the customer may use the API 255 to specify a time or day that the conditions in the event rules 215 are valid. For example, the customer may want the metric generator 210 to monitor the performance metric during times when the VM workload is light. Put differently, the customer already knows there are performance issues (e.g., high I/O latency) during times when the VM workload is high but wants to see high resolution performance data if there are performance issues when the VM workload is light (i.e., when performance issues are unexpected). Thus, the customer API 255 may generate an event rule 215 where the performance metric is only monitored during the time of day when the VM workload is historically low.

Additionally, event rules 215 may be defined by the service provider—i.e., the entity that controls the computing environment 105 and/or the storage system 130 shown in FIG. 1. In one example, the service provider generates the event rules 215 depending on the type of storage element in the mounted storage volume. For example, the event rule 215 may compare the performance metric (e.g., I/O latency 220) to a lower threshold value if the storage volume includes a solid-state drive rather than a hard disk drive. In one embodiment, the service provider may evaluate historical data to determine the value of the condition or threshold in the event rule 215. For example, if 99% of the storage volumes have average transaction rates that are greater than 20,000 transactions a second, the service provider may set the event rule 215 to trigger whenever the current transaction rate for the mounted storage volume falls below 20,000 transactions a second which indicates the storage volume is behaving abnormal relative to the other storage volumes in the storage system 130. The service provider may update the event rule 215 as more historical data is processed—i.e., increase or decrease the corresponding threshold.

The central monitoring system 140 includes a reporting application 235, input limiter 240, and scaling application 250. The reporting application 235 receives the performance data from the metric generator 210 in the I/O client 155 and outputs the data to the customer or a system administrator. For example, the reporting application 235 may generate a variety of charts, graphs, etc., that visually present aspects of the collected performance data. Further, the chart may be adjustable by the customer to alter the performance data displayed to the customer.

The input limiter 240 prevents the central monitoring system 140 from becoming overloaded by performance data received from multiple clients. For example, the reporting application 235 may receive performance data from multiple I/O clients 115 related to the performance of different storage volumes. If the number of I/O clients 115 transmitting high resolution performance data to the central monitoring system 140 increases, the system 140 may lack the compute capacity to timely process the received data. In another example, the I/O clients 155 may begin to transmit performance data for multiple types of data. For example, several of the I/O clients 155 may transmit performance data for both transaction rates and I/O latency when previously the I/O clients 155 transmitted performance data for only transaction rates. In another example, additional storage volumes may be mounted to a VM which means the amount of performance data generated by the corresponding I/O client 115 is increased. Any of these factors can increase the amount of performance data received by the central monitoring system which may inhibit the ability of the system 140 to process and provide near real-time reporting to a customer or system administrator.

The input limiter 240 may use a throttling metric to indicate whether the central monitoring system 140 is capable of processing the performance data. For example, the input limiter 240 may use the amount of performance data received or the rate at which the performance data is received as throttling metrics. In other examples, the throttling metrics may be CPU or memory utilization of the hardware system executing the central monitoring system 140. The input limiter 240 includes one or more thresholds 245 compared against the throttling metrics for determining when to reject received performance data so that the amount of performance data to be processed by the central monitoring system 140 does not exceeds its compute capacity. For example, if the amount of received performance data exceeds a threshold 245, the input limiter may reject the most recently received performance data (i.e., not accept any more performance data until the already received performance data has been processed). In one embodiment, the input limiter 240 may prioritize the performance data when the threshold 245 is crossed. For example, the input limiter 240 may discard newly received low resolution performance data but still accept high resolution performance data since this data is more likely to be relevant to the customer or system administrator. Further, the input limiter 240 may instruct the reporting application 235 to discard any low resolution performance data that has already been received so that the central monitoring system 140 can process newly received high resolution performance data. In this manner, the input limiter 240 can manage the amount of performance data received and processed by the reporting application 235.

The scaling application 250 can increase or decrease the compute capacity of the central monitoring system 140. The scaling application 250 can operate in response to real-time demands on the central monitoring system 140 such as when the amount of received performance data exceeds the threshold 245 or based on historical data. As an example of the latter, the scaling application 250 can evaluate historical demand on the central monitoring system 140 to predict the current or future demand on the system 140 and scale the compute capacity accordingly. In one embodiment, the central monitoring system 140 may execute on one or more of the VMs 110 illustrated in FIG. 1. The scaling application 250 can scale the compute capacity of the system 140 by adding or removing VMs assigned to perform the tasks of the central monitoring system 140.

Figure 3:
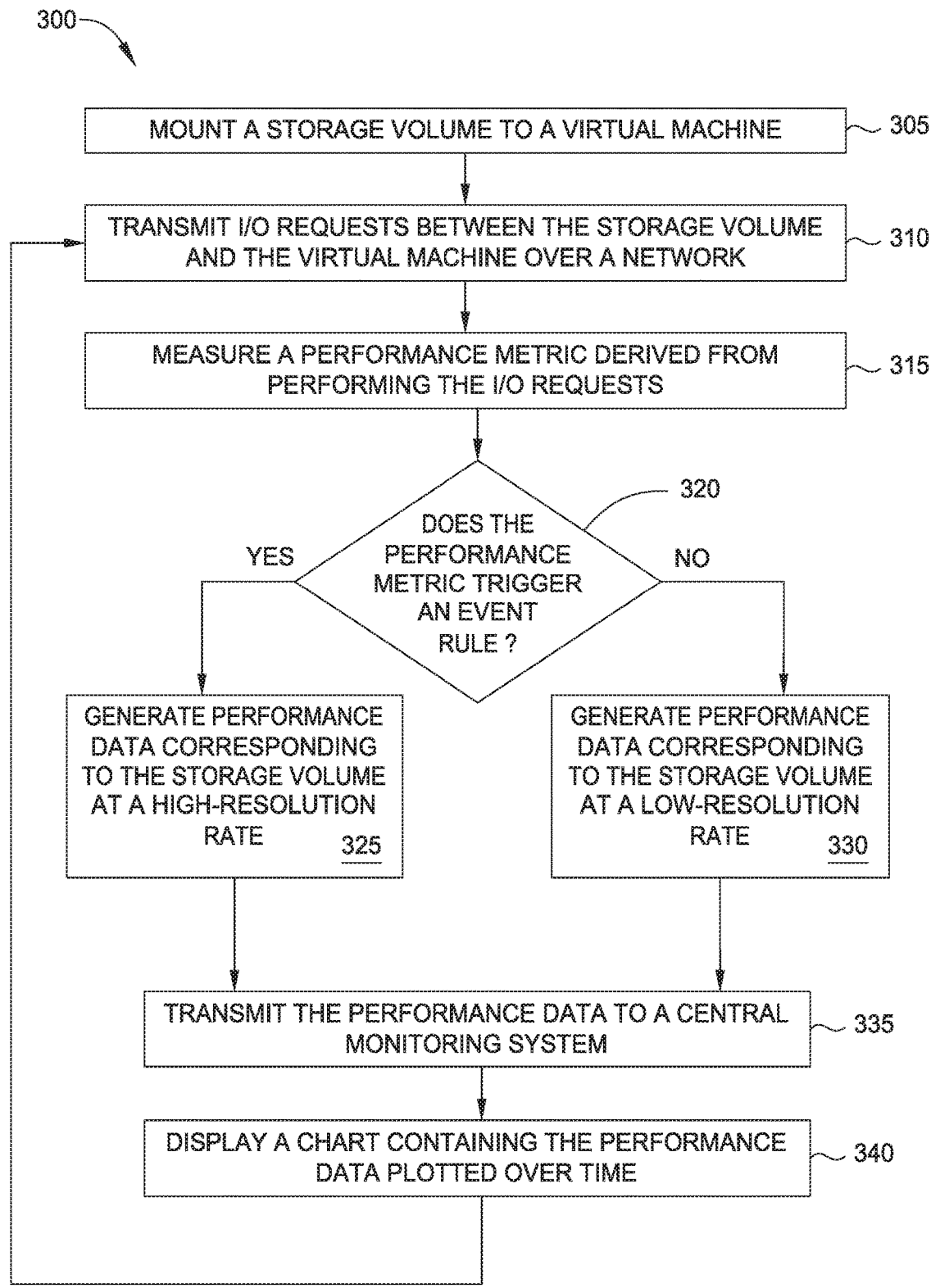
FIG. 3 is a flowchart for determining when to generate high resolution or low resolution performance data for a storage volume, according to various embodiments.

FIG. 3 illustrates a method 300 for determining when to generate high resolution or low resolution performance data for a storage volume, according to various embodiments. Method 300 begins at block 305 when an I/O client mounts a storage volume to a VM. For example, a mount point may be assigned to the storage volume which enables the VM to transmit I/O requests to the storage volume as if the storage volume was located on the same computing system hosting the VM. In one embodiment, the I/O client performs an authentication process to ensure the VM has the correct permissions to use the storage volume.

In one embodiment, the VM may mount multiple storage volumes. The VM may use a single I/O client instance to execute I/O requests on all the storage volumes or the VM may use respective I/O clients to execute the I/O requests on the different storage volumes.

At block 310, the storage handler in the I/O client transmits I/O requests between the storage volume and the VM over a network. The storage handler can transmit read and write requests to the storage volume which are then executed on the physical storage elements of the storage volume. If the I/O request is a read request, the storage handler returns the read data to the VM. If the I/O request is a write request, the storage handler may return a confirmation that indicates the write data was successfully stored in the storage volume.

At block 315, the metric generator in the I/O client measures a performance metric derived from performing the I/O requests. In one embodiment, the performance metric may be I/O latency such as the time taken to complete a single I/O request or the average time taken to complete a plurality of I/O requests. In this example, the metric generator may measure a first time stamp when the storage handler transmits the I/O request to the storage volume and a second time stamp when the I/O request is complete—i.e., the read data is received at the I/O client or when the I/O client receives a confirmation that the write data was successfully stored. The metric generator identifies the I/O latency for the I/O request by comparing the two time stamps. Moreover, the average I/O latency can be derived by measuring the individual I/O latency for a predefined number of I/O requests (e.g., 10,000 requests) or for all the requests that complete during a certain time period (e.g., every second) and then average the individual I/O latencies.

In another embodiment, the performance metric is the transaction rate of the storage volume, or in other words, the number of I/O requests the storage volume completes for a given time period. For example, the metric generator may count the number of I/O requests completed by the storage volume each second or minute.

In another embodiment, the performance metric is a data throughput rate of the storage volume—e.g., 1 Gb/s. To measure this rate, the metric generator may measure the total amount of read data transmitted and stored in the storage volume and the amount of write data received from the storage volume for all the completed I/O requests in a given time period—e.g., every second. In other embodiments, the performance metric may include a combination of the I/O latency, transaction rate, or data throughput rate. These performance metrics could also be monitored if the I/O requests were transmitted to other types of computing systems rather than to a networked storage volume such as a database or messaging application.

At block 320, the metric generator determines whether the performance metric triggers an event rule. As described above, the event rule generally specifies a condition or threshold compared to the measured performance metric. For example, if the performance metric is average I/O latency, the event rule could specify an average I/O latency of 100 ms as the threshold or condition for transitioning between low resolution and high resolution performance data. Moreover, the event rule may provide conditions or thresholds for different performance metrics—e.g., an average I/O latency of 100 ms and a data throughput rate of 500 Mb/s. One advantage of using multiple performance metrics to determine if an event rule is triggered is that this allows the system administrator to identify a performance issue that is different than one where the storage volume is busy simply because the I/O client has transmitted a lot of I/O requests to the storage volume. For example, the I/O latency of the individual I/O requests may suddenly increase because the I/O client has transmitted 25% more read/write requests to the storage volume which is a different performance issue than a hard drive becoming corrupted or a bad network connection between the VM and the storage volume. To distinguish between a storage volume being busy and other performance issues, the customer may define an event rule where the I/O latency must be above the 100 ms and the data throughput rate below 500 Mb/s to trigger or satisfy the rule. For example, if the I/O latency increases to 100 ms but the data throughput rate is 2 Gb/s, the storage volume is functioning as expected but has a lot of work to perform which is a different performance issue than a storage volume that has an I/O latency of 100 ms but a data throughput of 100 Mb/s. Thus, adding more conditions and thresholds may result in the event rule being triggered or satisfied only in response to specific types of performance issues.

If the performance metrics measured at block 315 satisfies these conditions (e.g., the I/O latency is above 100 ms and the data throughput rate is below 500 Mb/s), method 300 proceeds to block 325 where the metric generator generates performance data corresponding to the storage volume at a high-resolution time rate. In one embodiment, the metric generator switches from generating the performance data at a low resolution time rate to the high resolution time rate. For example, the metric generator may determine the transaction rate of the storage volume every second rather than every ten seconds. Alternatively, the metric generator may determine the average I/O latency and the data throughput of the storage volume every ten seconds rather than every thirty seconds.

As described above, generating high resolution performance data can include measuring or collecting performance data at an increased time rate—e.g., transaction rates for every second rather than every minute. Additionally, in another embodiment, generating the high resolution performance data includes measuring or collecting additional types of performance data relative to the amount of data in low resolution performance data. For example, high resolution performance data can include both I/O latency and transaction rates for a storage volume while the low resolution performance data includes only I/O latency. Thus, the time rate used to measure the performance data may stay the same relative to low resolution and high resolution data but additional types of performance data can be collected by the metric generator when generating high resolution performance data. For example, when generating low resolution performance data, the metric generator determines the average I/O latency every second. When generating high resolution performance data, however, the metric generator determines both the average I/O latency and the transaction rate for every second. Thus, generating performance data at the high resolution rate can include increasing the time rate used to measure or collect the performance data as well as measuring or collecting additional types of performance data.

However, if at block 320 the performance metric does not trigger the event rule, method 300 proceeds to block 330 where the metric generator generates (or collects) performance data corresponding to the storage volume at the low-resolution time rate. In one embodiment, generating the low resolution performance data is a default setting of the metric generator. Stated differently, until the performance metric (or metrics) triggers at least one event rule, the metric generator generates performance data at the low-resolution time rate.

However, in another embodiment, when switching from the high resolution rate to the low resolution rate, the time rate used to collect the performance data may remain the same but the metric generator collects less performance data—i.e., measures only transaction rate performance data every minute rather than both transaction rate and data throughput performance data every minute.

At block 335, the metric generator transmits the performance data to the central monitoring system. The bandwidth required to transmit the performance data, as well as the compute capacity required to process the performance data, varies depending on whether the performance data is measured at the low or high resolution time rate. For example, determining the average I/O latency every second rather than every minute results in a sixty fold increase of performance data being transmitted to the central monitoring system. Thus, using event rules to determine when to transmit high versus low resolution performance data may reduce the bandwidth and compute capacity of the central monitoring system relative to a system that always transmits high resolution performance data to the central monitoring system.

In one embodiment, the metric generator transmits (e.g., publishes) the high resolution performance data to the central monitoring system at shorter intervals than when transmitting low resolution performance data to the central monitoring system. For example, the metric generator may publish the average I/O latency every second to the central monitoring system when transmitting high resolution performance data but every minute when transmitting low resolution I/O latency performance data. Alternatively, the metric generator may transmit the performance data to the central monitoring system at the same interval regardless if the performance data is collected at the high resolution or low resolution rate.

Although method 300 describes using a performance metric to switch between a low resolution and high resolution rate, in other embodiments, the metric generator may switch between a plurality of different resolution rates. For example, the performance metric can be compared to multiple thresholds in an event rule (e.g., 100 ms, 150 ms, and 200 ms). As the current value of the performance metric increase and triggers the event rules, the metric generator may switch from generating performance data at a low resolution rate, medium resolution rate, and a high resolution rate.

As shown in FIG. 3, the metric generator uses the event rules to determine whether to transmit the low resolution or high resolution performance data to the central monitoring system, but the metric generator may also use the event rules to determine whether the generate the high or low resolution performance data. For example, the metric generator may generate the high resolution performance data only when an event rule is triggered thereby saving the compute resources used in a computing system to execute the I/O client. Alternatively, the metric generator may always generate the high resolution performance data but transmit only low resolution performance data (i.e., a sub-portion of the high resolution performance data) to the central monitoring system except when the threshold of the event rule is triggered at block 320. Put differently, the metric generator may collect and transmit low resolution performance data using high resolution performance data. For example, the metric generator may use the average I/O latency of the storage volume as both the performance metric and the performance data. To determine if the average I/O latency satisfies the threshold of the event rule, the metric generator may measure the average I/O latency every second. But if the average I/O latency is less than the threshold, the metric generator collects and transmits the average I/O latency for every minute (even though the metric generator has determined the average I/O latency for every second). However, when the average I/O latency crosses the threshold of the event rule, the metric generator transmits the average I/O latency for every second to the central monitoring system (i.e., the high resolution performance data) which is the same rate at which the performance metric is measured.

At block 340, the reporting application in the central monitoring system displays a chart containing the performance data plotted over time. In one embodiment, the performance data includes timestamps so the data can be arranged according to time on an axis of the chart. In other cases, the reporting application may present dynamic displays indicating a transaction rate of the storage volume updated as performance data is received from the I/O client. The customer can log into a webpage presenting a bar graph which has a height that changes each time new performance data is received. If an event rule is not triggered, the reporting application may update the bar graph every minute according to the low resolution time rate. However, if the event rule is triggered, the bar graph changes every second according to the high resolution time rate. In another example, the reporting application may use a color scheme that changes each time the performance data is received (e.g., red indicates a high latency and green indicates low latency).

Method 300 returns to block 310 where the storage handler in the I/O client continues to transmit I/O request to the storage volume. The method 300 can then repeat where the metric generator determines whether an updated performance metric triggers the event rule and whether low resolution or high resolution performance data should be transmitted to the central monitoring system.

Figure 4:
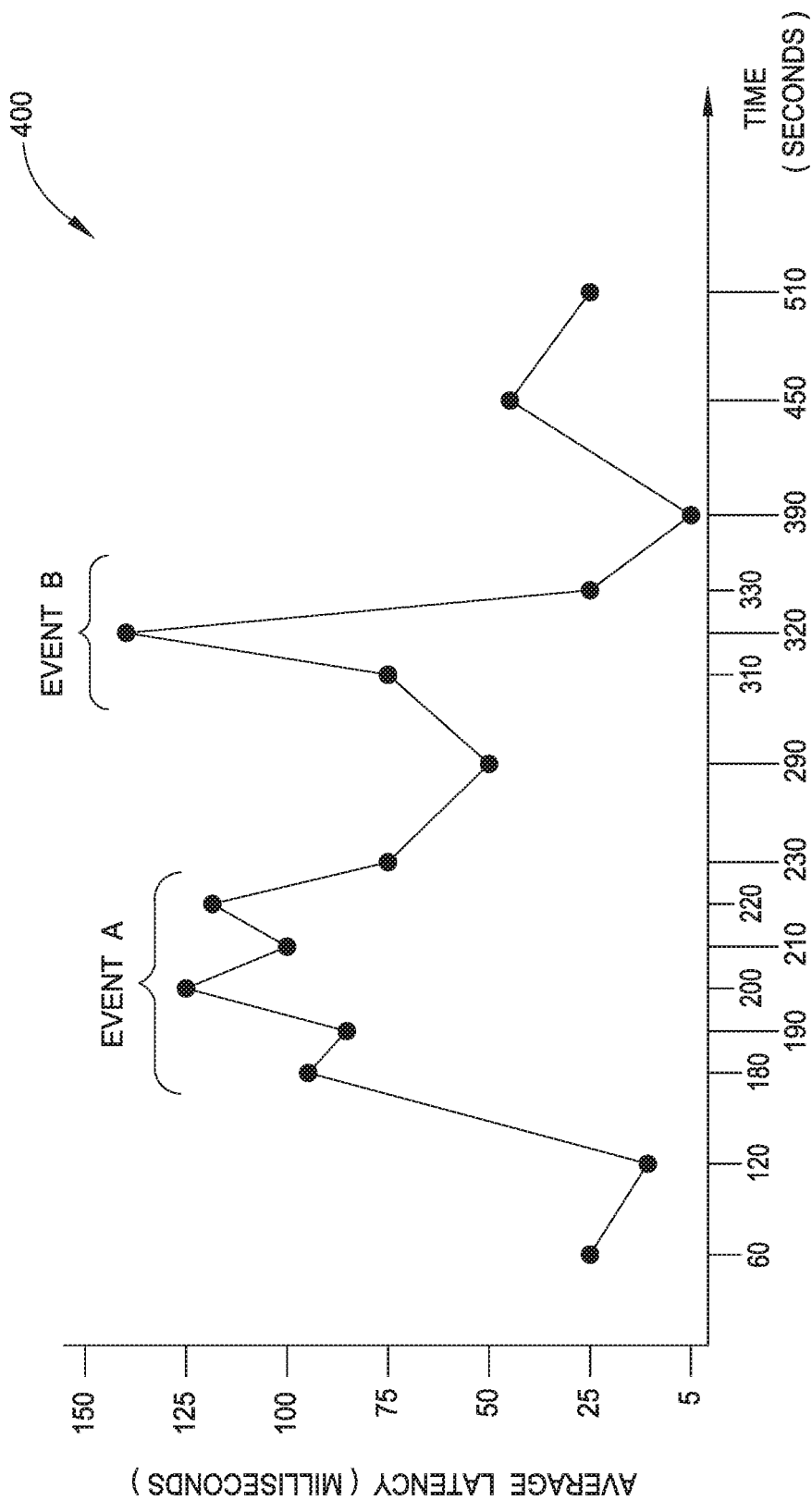
FIG. 4 is a chart for displaying high resolution and low resolution performance data to a customer, according to various embodiments.

FIG. 4 is an example of a chart 400 displaying high resolution and low resolution performance data to a customer, according to various embodiments. The x-axis is a time axis that is measured in seconds. The y-axis indicates the average latency (in milliseconds) for a particular time period. As shown, the far left data point indicates the average latency (e.g., 25 ms) for the first sixty seconds. In this example, sixty seconds is the low resolution time rate at which the I/O client generates the performance data (e.g., latency). A second data point is generated for the next minute—i.e., 60-120 seconds—and a third data point is generated for the third minute—i.e., 120 seconds to 180 seconds. However, at 180 seconds Event A occurs which triggers the I/O client to transmit high resolution performance data at a rate of every ten seconds. For example, the I/O client may have detected a spike in the I/O latency or that the I/O latency has risen and the transaction rate has fallen. In any case, as described in method 300, the I/O client begins transmitting the high resolution performance data to the central monitoring system.

To add the high resolution performance data to chart 400, the reporting application divides the time axis into ten second intervals where a latency data point is plotted every ten seconds. This continues until 230 seconds when the reporting application no longer receives the high resolution performance data but again receives the low resolution performance data—i.e., Event A has ended. For the next minute (e.g., between 230 and 290 seconds), the chart 400 includes a data point at the low resolution time rate. However, before the following minute is over, the metric generator switches to transmitting performance data at the high resolution time rate in response to the beginning of Event B where again, the I/O latency spikes. Event B continues until 330 seconds when the performance data is again reported at the low resolution time rate.

In one embodiment, the chart 400 is displayed on demand on a webpage (e.g., a customer web portal) or a diagnostic application. For example, the customer or system administrator may request the performance data for the last five minutes or for a certain date or time. In one embodiment, the chart 400 is interactive such that the customer can zoom in to a particular time or cluster of data points. Moreover, the customer can control the scale of the x and y axes such as changing a linear axis to a logarithmic axis.

In another embodiment, the reporting application updates the chart 400 in real-time—i.e., as performance data is received from the I/O client. For example, the time axis may shift from right to left as new performance data is plotted and old performance data is removed from the chart 400.

Figure 5:
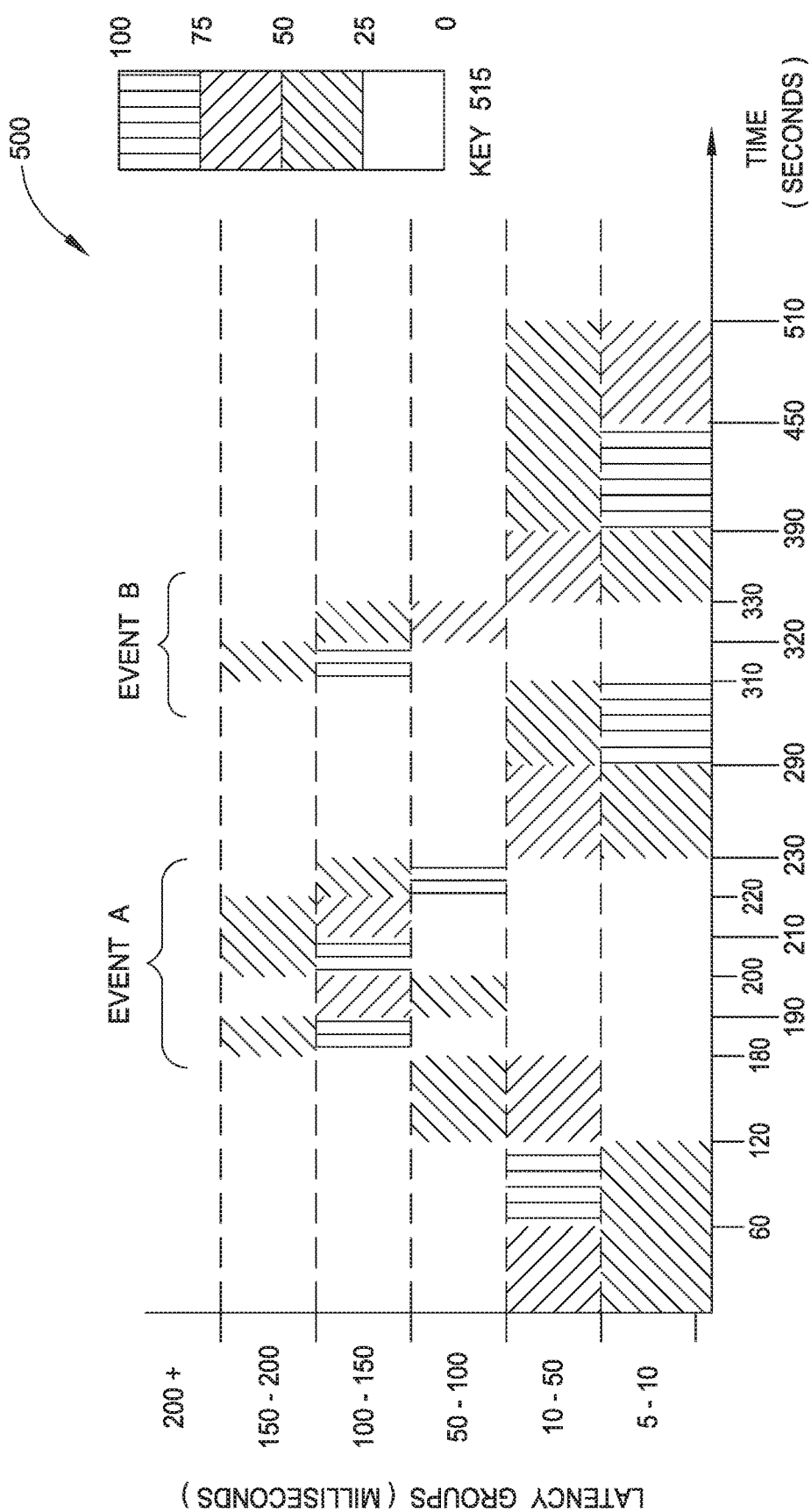
FIG. 5 is a chart for displaying high resolution and low resolution performance data to a customer, according to various embodiments.

FIG. 5 is an example of a chart 500 displaying high resolution and low resolution performance data to a customer, according to various embodiments. As shown, the time axis for chart 500 is the same as the chart 400 in FIG. 4 but the manner in which the performance data is presented to the customer on the y-axis is different. In chart 500, the latency of the I/O requests completed during a time period are arranged in different groups for a particular time period according to the shading shown in a key 515. For example, during 0-60 seconds, 50-75% of the I/O requests had an I/O latency between 10-50 ms, while 25-50% of the I/O requests had a latency between 5-10 ms. Rather than plotting an average for all the completed I/O requests, the shading defined by the key 515 is used to illustrate the distribution of the latency across one or more latency groups. Relative to chart 400, the chart 500 provides more detailed information on the distribution of the latencies during a specific time period which may better enable the customer or system administrator to identify a performance issue and decide on an appropriate action such as mounting additional storage volumes to a VM, switching to a larger storage volume, switching to storage volume with low latency storage elements, upgrading a network connection between the VM and the storage volume, and the like.

Figure 6:
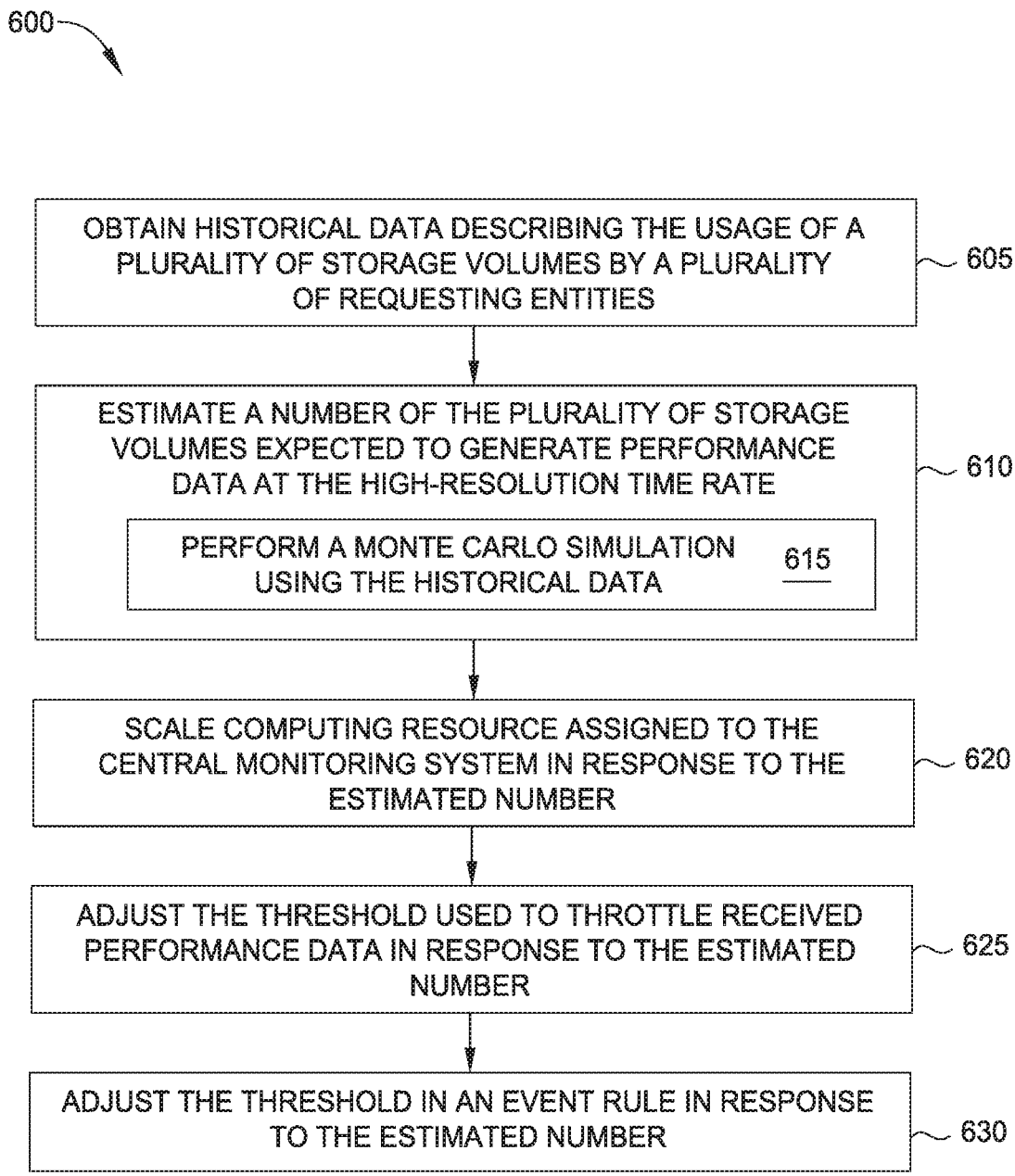
FIG. 6 is a flow chart for scaling the central monitoring system to handle the performance data transmitted by I/O clients, according to various embodiments.

FIG. 6 illustrates a method 600 for scaling the central monitoring system to handle the performance data transmitted by I/O clients, according to various embodiments. The method 600 begins at block 605 where the scaling application on the central monitoring system obtains historical data describing the usage of the plurality of storage volumes by a plurality of requesting entities (e.g., VMs, user computing devices, databases, etc.). The scaling application may track the amount of data transmitted to the volumes, the latency of the I/O requests, and the number of I/O requests processed by the storage volumes. This information informs the scaling application how the requesting entities use the storage volumes and any corresponding performance issues.

At block 610, the scaling application estimates a number of the plurality of storage volumes expected to generate performance data at the high-resolution time rate. That is, the scaling application can evaluate the historical data to determine the expected number of storage volumes that have corresponding I/O clients that generate the high resolution performance data. To do so, the scaling application can use the condition and threshold of the event rules to determine, at any point of time, which of the storage volumes would have performance metrics that trigger the event rules. For example, if the threshold is an I/O latency of 100 ms, the scaling application can review the historical data to determine, for a particular data and time, how many of the scaling volumes had latencies above this threshold. Moreover, because the number may change depending on the time of day or time of year (e.g., a season or holiday), the scaling application may track how the number of storage volume that satisfy the threshold changes.

With this information, the scaling application can estimate for a given time—e.g., a time of day, a particular week, a holiday, etc.—the percentage of storage volumes expected to generate high resolution performance data. For example, the scaling application may determine that 2% of the storage volumes satisfy the threshold of an event rule during the day time hours but only 0.5% of the storage volumes satisfy the threshold during the nighttime hours. Or the scaling application may determine that an average of 0.5% of storage volumes that have solid-state drives trigger an event rule while an average of 1.5% of the storage volumes that have hard disk drives trigger the event rule.

Optionally, at block 615, the scaling application performs a simulation, for example a Monte Carlo simulation, using historical data describing the I/O patterns and requests of the requesting entities to estimate the number of storage volumes expected to generate performance data at the high-resolution time rate. Using the historical data, the scaling application can execute a simulation that includes simulated servers (e.g., requesting entities) and simulated storage volumes. The scaling application can determine how often the simulated servers transmit more I/O request to the storage volumes than the storage volumes can handle. In other words, the scaling application can use the Monte Carlo simulation to determine, based on the historical data, how often the storage volumes are overworked. Further, the scaling application can determine when a performance metric of the storage volumes would satisfy an event rule, thereby triggering the I/O client to generate the high resolution performance data. For example, the scaling application may learn from the Monte Carlo simulation that on average of 1% of those systems generate high resolution performance data at any given time. If the VMs 110 in FIG. 1 have similar usage patterns as the requesting entities in the Monte Carlo simulation, the scaling application can estimate that 1% of the mounted storage volumes 135 will cause the I/O client 115 to report high resolution performance data.

At block 620, the scaling application scales the computing resources assigned to the central monitoring system in response to the estimated number. Put differently, the scaling application alters the compute capacity of the central monitoring system so that the system can handle the increased data that comes from storage volumes that correspond to high resolution performance data. For example, the scaling application may receive real-time updates regarding how many of the storage volumes are currently mounted to a VM—i.e., how many of the storage volumes are currently being used and how many are inactive. Using the estimated number derived at block 610, the scaling application can determine how many of the mounted storage volumes are expected to cause the I/O client to generate high resolution performance data. For example, the scaling application may allocate 20% more compute resources to the central monitoring system if 2% of the storage volumes are expected to generate the high resolution performance data relative to only 1%.

Moreover, the scaling application can consider the types of the storage volumes—e.g., solid disk drives versus hard disk drives. As discussed above, the number of storage volumes expected to generate the high resolution performance data may change depending on the underlying storage elements in the volumes. The scaling application may determine a ratio of the storage volumes that have solid-state drives versus those that have hard disk drives which can be used to estimate the amount of compute capacity for the central monitoring system. For example, if the mounted storage volumes all use solid state disk drives (which typically have better performance), the scaling application may allocate less compute capacity to the central monitoring system than if some of the mounted storage volumes include hard disk drives.

In one embodiment, the scaling application may dynamically change the compute resources assigned to the central monitoring system. As described above, the estimated number of storage volumes that generate high resolution performance data may change depending on a time of day, a holiday, a particular season, etc. Thus, the scaling application may add or remove VMs allocated to the central monitoring system depending on these factors. Moreover, as additional storage volumes are activated, e.g., mounted to a storage volume, or deactivated, the scaling application may continually evaluate the total number of activate storage volumes and scale the computing resources of the central monitoring system accordingly.

In one embodiment, in addition to the estimated need derived using method 600, the scaling application alters the compute capacity of the central monitoring system in response to immediate need for additional computing resources. For example, the input limiter in the central monitoring system may inform the scaling application that the performance data currently being received exceeds the compute capacity of the central monitoring system as described above. In response, the scaling application can increase the compute resources for the monitoring system.

In addition to scaling the compute resources (or as an alternative), the estimated number of storage volumes can be used to adjust throttling thresholds (at block 625) or event rule thresholds (at block 630) so that the amount of high resolution performance data processed by the central monitoring system is reduced. For example, at block 625, the input limiter in the central monitoring system adjusts the threshold used to throttle received performance data in response to the estimated number. Specifically, referring to FIG. 2, the input limiter can lower the throttle threshold 245 in response to a relatively higher estimated number and, conversely, raise the throttle threshold in response to a relatively lower estimated number. For example, if the estimated number of storage volumes expected to generate high resolution performance data would overwhelm the computing resources of the central monitoring system, the input limiter can lower the threshold 245 used to determine whether to throttle the incoming performance data by rejecting the high resolution performance data. By lowering the threshold 245, the input limiter 240 begins to discard received high resolution performance data earlier than it would otherwise with a higher threshold 245 which can ensure that the central monitoring system has enough compute resources available to, at a minimum, process and plot the low resolution performance data. Lowering the threshold 245 may be desired, for example, if it is too costly to add more compute resources at block 620 or if there are no more compute resources available.

At block 630, the I/O client adjusts the threshold in the event rule in response to the estimated number. For example, if the scaling application determines that the central monitoring system does not have enough available compute resources to handle the estimated number of storage volumes generating high resolution performance data (or adding compute resources is too costly), the I/O client can alter the thresholds in the event rules so it is less likely a performance metric will trigger the event rule resulting in the I/O client transmitting high resolution performance data to the central monitoring system.

Although the embodiments herein describe selecting whether to generate low resolution or high resolution performance data depending on a performance metric derived from performing I/O requests, the techniques herein can be used with any computing system that generates performance data for computing entities. For example, instead of I/O requests, the performance metric could be the packet latency or packet throughput between network devices. Depending on the packet throughput or latency, a controller may report either low or high resolution performance data for the network devices. In another example, a bus controller can monitor the amount of data flowing between different hardware entities (e.g., a processor, accelerator, algorithmic units, cache memory, etc.) coupled to a bus and alter the granularity of the performance data generated for these hardware entities in response to a measured performance metric. In another example, a monitoring system can monitor jobs or tasks completed by a distributed set of computing clusters (e.g., a Hadoop job) and switch from low resolution to high resolution performance data when the job/task slows down.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used to implement embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method, comprising:
   mounting, on behalf of a virtual machine, a storage volume;

transmitting a plurality of input/output (I/O) requests from the virtual machine to the storage volume over a network, wherein the storage volume is presented to the virtual machine as a mounted drive;

measuring a value for a performance metric associated with one or more of the I/O requests;

determining the measured value of the performance metric satisfies a condition specified in at least one event rule;

in response to determining that the measured value satisfies the condition, generating storage volume status data at a high-resolution rate;

in response to determining that the measured value does not satisfy the condition, generating the storage volume status data at a low-resolution rate, wherein the storage volume status data generated at the high-resolution rate includes more data points regarding a status of the storage volume for a given time period relative to the storage volume status data generated at the low-resolution rate for the given time period;

transmitting the storage volume status data generated at the high-resolution rate or the low-resolution rate to a monitoring system, wherein the monitoring system collects status data corresponding to a plurality of storage volumes;

generating for display a chart of the storage volume status data, wherein a visualization of the storage volume status data presented in the chart varies depending on whether the storage volume status data was generated at the high-resolution rate or the low-resolution rate.

2. The method of claim 1, wherein measuring the performance metric comprises:

measuring a latency between when a write request is transmitted to the storage volume over the network until a write complete confirmation is received from the storage volume, wherein the condition comprises a latency threshold to which the latency is compared in order to determine if the performance metric satisfies the condition.

3. The method of claim 1, wherein the chart comprises the storage volume status data measured at both the low-resolution and high-resolution rates, and wherein the chart indicates a respective number of I/O requests grouped into different value ranges of the performance metric.

4. The method of claim 1, further comprising:

estimating a number of the plurality of storage volumes that is expected to have performance issues which result in the monitoring system receiving the storage volume status data generated at the high-resolution rate; and scaling computing resources corresponding to the monitoring system in response to the estimated number of the plurality of storage volumes expected to have performance issues so that the monitoring system can process the storage volume status data.

5. A system, comprising:

at least one computer processor; and at least one memory storing a program which, when executed by the system, performs an operation comprising:

attaching, on behalf of a virtual machine, a storage volume;

transmitting input/output (I/O) requests from the virtual machine to the storage volume over a network, wherein the storage volume is attached to the virtual machine as a mounted drive;

measuring a value of a performance metric associated with the I/O requests performed on the storage volume;

generating performance data corresponding to the I/O requests performed on the storage volume storage volume at a low-resolution rate until determining that the value of the performance metric satisfies an event rule;

in response to determining that the value of the performance metric satisfies the event rule, switching from generating performance data corresponding to I/O requests performed on the storage volume at the low-resolution rate to a high-resolution rate, wherein the performance data generated at the high-resolution rate includes more data points regarding the performance of the storage volume for a given time period relative to the performance data generated at the low-resolution rate for the given time period; and transmitting the performance data generated at the high-resolution rate and the low-resolution rate to a monitoring system.

6. The system of claim 5, wherein the performance metric comprises at least one of an average latency of completing the plurality of I/O requests, an amount of data sent to or received from the storage volume when completing the plurality of I/O requests, and a total number of I/O requests performed in a fixed time period.

7. The system of claim 5, wherein the operation comprises:

receiving the event rule from an application programming interface (API), wherein the API enables a user to define a type of the performance metric and a threshold of the performance metric that indicates when the event rule is satisfied.

8. The system of claim 5, wherein the storage volume and the virtual machine are hosted on computing systems communicatively coupled via the network, wherein a computing system hosting the virtual machine comprises an I/O client, wherein the I/O client is configured to transmit I/O requests from the virtual machine to the storage volume and measure the performance metric.

9. The system of claim 8, wherein the I/O client is executed on the computing system hosting the virtual machine and is external to the virtual machine.

10. The system of claim 5, the operation comprising:

estimating a number of a plurality of storage volumes that is expected to have performance issues which result in the monitoring system receiving the performance data generated at the high-resolution rate from a plurality of I/O clients;

determining the number of the plurality of storage volumes expected to have performance issues has increased; and increasing computing resources assigned to the monitoring system.

11. The system of claim 10, wherein estimating the number of the plurality of storage volumes expected to have performance issues comprises:

performing a Monte Carlo simulation to determine the number of the plurality of storage volumes expected to have performance issues based on at least in part historical data describing the usage of the plurality of storage volumes by a plurality of requesting entities.

12. The system of claim 5, wherein the operation comprises:

after receiving the performance data generated at the high-resolution rate and the low-resolution rate at the monitoring system, determining a throttling metric of the monitoring system indicating whether the monitoring system is capable of processing the performance data generated at the high-resolution rate;

determining the throttling metric satisfies a threshold; and disregarding the performance data generated at the high-resolution rate.

13. A method, comprising:

attaching, on behalf of a virtual machine, a storage volume;

transmitting input/output (I/O) requests from the virtual machine to the storage volume over a network, wherein the storage volume is attached to the virtual machine as a mounted drive;

measuring a value of a performance metric derived from completing the I/O requests on the storage volume;

generating performance data corresponding to the I/O requests performed on the storage volume storage volume at a low-resolution rate until determining that the value of the performance metric satisfies an event rule;

in response to determining that the value of the performance metric satisfies the event rule, switching from generating performance data corresponding to I/O requests performed on the storage volume at the low-resolution rate to a high-resolution rate, wherein the performance data generated at the high-resolution rate includes more data points measuring a performance of the storage volume for a given time period relative to the performance data generated at the low-resolution rate for the given time period; and transmitting the performance data generated at the high-resolution rate and the low-resolution rate to a monitoring system.

14. The method of claim 13, wherein the performance metric comprises at least one of an average latency of completing the plurality of I/O requests, an amount of data sent to or received from the storage volume when completing the plurality of I/O requests, and a total number of I/O requests performed in a fixed time period.

15. The method of claim 13, further comprising:

receiving the event rule from an API, wherein the API enables a user to define a type of the performance metric and a threshold of the performance metric that indicates when the event rule is satisfied.

16. The method of claim 13, wherein the storage volume and the virtual machine are hosted on computing systems communicatively coupled via the network, wherein a computing system hosting the virtual machine comprises an I/O client, wherein the I/O client is configured to transmit I/O requests from the virtual machine to the storage volume and measure the performance metric.

17. The method of claim 16, wherein the I/O client is executed on the computing system hosting the virtual machine and is external to the virtual machine.

18. The method of claim 13, further comprising:

estimating a number of a plurality of storage volumes that is expected to have performance issues which result in the monitoring system receiving the performance data generated at the high-resolution rate from a plurality of I/O clients;

determining the number of the plurality of storage volumes expected to have performance issues has increased; and increasing computing resources assigned to the monitoring system.

19. The method of claim 13, further comprising:

after receiving the performance data generated at the high-resolution rate and the low-resolution rate at the monitoring system, determining a throttling metric of the monitoring system indicating whether the monitoring system is capable of processing the performance data generated at the high-resolution rate;

determining the throttling metric satisfies a threshold; and disregarding the performance data generated at the high-resolution rate.

* * * * *

UNITED STATES PATENT AND TRADEMARK OFFICE
CERTIFICATE OF CORRECTION

PATENT NO. : 10,432,483 B1  
APPLICATION NO. : 15/276571  
DATED : October 1, 2019  
INVENTOR(S) : James Michael Thompson Page 1 of 1

It is certified that error appears in the above-identified patent and that said Letters Patent is hereby corrected as shown below:

In the Claims

In Column 18, Lines 5-6, in Claim 5, after "storage volume" delete "storage volume".

In Column 19, Lines 19-20, in Claim 13, after "storage volume" delete "storage volume".

Signed and Sealed this
Fourteenth Day of January, 2020

Andrei Iancu
*Director of the United States Patent and Trademark Office*